United States Patent
Miyajima et al.

(10) Patent No.: US 7,748,776 B2
(45) Date of Patent: Jul. 6, 2010

(54) STORAGE STRUCTURE FOR STORING A COVER MEMBER OF A SLIDING ROOF TYPE VEHICLE AND VEHICLE HAVING THE SAME

(75) Inventors: Junpei Miyajima, Yokosuka (JP); Koji Yoshida, Yokosuka (JP); Tomohide Noba, Yokosuka (JP)

(73) Assignee: Kanto Auto Works, Ltd. (JP)

( * ) Notice: Subject to any disclaimer, the term of this patent is extended or adjusted under 35 U.S.C. 154(b) by 0 days.

(21) Appl. No.: 12/209,114

(22) Filed: Sep. 11, 2008

(65) Prior Publication Data

US 2009/0096241 A1    Apr. 16, 2009

(30) Foreign Application Priority Data

Oct. 15, 2007  (JP)  ............... 2007-268436
Oct. 23, 2007  (JP)  ............... 2007-275810

(51) Int. Cl.
  *B60J 7/06*  (2006.01)
(52) U.S. Cl. .................................... 296/219
(58) Field of Classification Search ................ 296/219
  See application file for complete search history.

(56) References Cited

U.S. PATENT DOCUMENTS

| 6,431,636 | B1 | 8/2002 | Schutt |
| 2004/0051347 | A1* | 3/2004 | Manders et al. ............. 296/219 |
| 2004/0090092 | A1* | 5/2004 | de Gaillard et al. ......... 296/222 |
| 2007/0024080 | A1 | 2/2007 | Grimm et al. |

FOREIGN PATENT DOCUMENTS

DE    10104522    *    8/2002

(Continued)

OTHER PUBLICATIONS

Applicants hereby bring attention of the examiner to: Pending U.S. Appl. No. 12/209,085, Ryouta Fujishima, "Sliding Roof Structure and Vehicle Having the Same", filed on Sep. 11, 2008.

(Continued)

*Primary Examiner*—Dennis H Pedder
(74) *Attorney, Agent, or Firm*—Chen Yoshimura LLP

(57) ABSTRACT

A storage structure for a cover member of a sliding roof type vehicle is equipped with a cover member (20) capable of open and close for covering the opening section formed in the roof of the vehicle, the first rails (13R, 13L) for guiding the opening or closing of the cover member (20) provided along the right and left sides of the opening section, a tray (30) for placing the cover member in folded state installed at the rear of the first rails, a holding means (50) for holding the tray (30) rotatably at a first position A, and a storage means (85) installed at the back of the last row of seat of the vehicle, wherein the storage means (85) is composed of a second rails (40) extending downward from the first position A and a storage box (80) provided on a vehicle deck connected to the second rails (40), and, with the folded cover member (20) placed on the tray (30), the tray (30) is rotated by the holding means (50), thereby the folded cover member (20) is stored by guiding the tray (30) to the second rails (40) and moving the second position B in the storage box (80).

10 Claims, 17 Drawing Sheets

FOREIGN PATENT DOCUMENTS

| | | | |
|---|---|---|---|
| DE | 10104526 | * | 10/2002 |
| EP | 1167096 | * | 6/2001 |
| FR | 2797816 | * | 3/2001 |
| FR | 2797818 | * | 3/2001 |
| JP | 03-061419 U | | 6/1991 |
| JP | 04-300719 A | | 10/1992 |
| JP | 06-183263 A | | 7/1994 |
| JP | 2001-354037 A | | 12/2001 |
| JP | 2002-046473 A | | 2/2002 |
| JP | 2003-507244 A | | 2/2003 |
| JP | 2005-313737 A | | 11/2005 |
| WO | 01-14157 A1 | | 3/2001 |
| WO | WO01/14158 | * | 3/2001 |

OTHER PUBLICATIONS

Applicants hereby bring attention of the examiner to: Pending U.S. Appl. No. 12/209,121, Jun Kanamori, "Storage Structure for a Cover Member of a Sliding Roof Type Vehicle and a Vehicle Provided with the Same", filed on Sep. 11, 2008.

Applicants hereby bring attention of the examiner to: Pending U.S. Appl. No. 12/209,130, Fujishima, et al., "Sliding Roof Structure and Vehicle Equipped with the Same", filed on Sep. 11, 2008.

* cited by examiner (A)

(B)

STORAGE STRUCTURE FOR STORING A COVER MEMBER OF A SLIDING ROOF TYPE VEHICLE AND VEHICLE HAVING THE SAME

TECHNICAL FIELD

The present invention relates to a roof structure that can be opened or closed over an opening section in a roof of a vehicle, more specifically, to a storage structure for a cover member of a sliding roof type vehicle, wherein the folded cover member is transferred to inside the vehicle for storage.

BACKGROUND ART

The so-called sliding roof type vehicles are well known which are provided with an opening section in a roof and said opening section is covered so as to be opened or closed. As shown in FIG. 16, a vehicle of a type whose opening section in its roof can be opened or closed with a cover member (hereinafter referred to as a sliding roof type vehicle) 501 is provided with a wide opening section 502a in its roof 502. Along its slide rails (not shown), which are provided along both sides of the opening section 502a, multiple sliding members for supporting both edges of the cover member 503 are mounted slidably in a front-and-rear direction. The multiple sliding members are provided on both sides of the cover member 503 in a longitudinal direction and at specified intervals.

With the structure, the opening section 502a of the roof 502 can be closed by moving each sliding member along the slide rails toward the front of the vehicle, thus spreading the cover member. On the contrary, by moving each sliding member toward the rear end of the vehicle along the slide rail, the opening section 502a of the cover member 503 is folded around the rear end of the vehicle to open the section 502a.

With the sliding roof structure, the folded cover member 503 occupies some part of the rear area of the opening section 502a by the length L1 in the longitudinal direction, and swells upward from the roof 502. Consequently, the opening section 502a of the roof 502 is limited to L2, which is shorter by L1 than the total longitudinal length L of the opening section, thus making the opening section 502a of the roof 502 smaller and damaging the appearance of the vehicle.

When the rear window 504 is opened, the rear end 502b of the roof 502 and the folded cover member 503 exist between the opening section of the rear window 504 and the opening section 502a of the roof 502, which spoils the sense of openness when the rear window 504 is opened.

JP2005-313737A discloses a roof storage structure of a vehicle provided with a storage space for constructional elements of the roof at the back of the rear seat of the vehicle. This structure stores the constructional elements of the roof in a packaged tray, which is rotated by a rotating mechanism, and stored in the storage space.

JP2002-046473A discloses a convertible automobile that the roof is supported in a state in which the front and the rear sides of the roof are movable along the vehicle body. The front and the rear sides of the roof are stored in a roof storage chamber. The front side of the roof is oscillated when it comes down into the roof storage chamber by the function of the oscillation support device, and stored there diagonally or virtually vertically.

JP2003-507244 (WO01/014157) discloses a cassette constituting a rear window that can be slid along the arch-like side panel of a vehicle, a flexible roof module, which can be removed in overlaid state, and a vehicle equipped with the cassette and the module.

In the roof storage structure described in the above-mentioned JP2005-31373A, the storage space for members comprising the roof is relatively large, and especially long in the longitudinal direction, minimizing the passenger space and thus sacrificing the convenience.

In the roof of an convertible vehicle described in the above-mentioned JP2002-046473A, the storage space for the roof is as large as in the case of a roof storage structure described in JP2005-313737A, which also makes the passenger capacity small and sacrifices convenience.

With the removable roof module in JP2003-507244A (WO01/014157), the cassette and flexible roof devices slide along the side panel on the roof, and stored in the storage unit under the floor of the trunk. Since its covering module has a complicated structure, in order to store the cassette and the flexible roof devices, the rear hatch must be opened first, the floor of the trunk must be pulled toward the rear side, and then the cassette and the flexible roof devices must be taken into the storage unit. The storage thus requires complicated operations, making it difficult to store or extend the roof while the operator is sitting in the vehicle.

It is an object of the present invention to provide a cover member storage structure of a sliding roof vehicle that allows the covering member comprising the roof to be stored in folded state without sacrificing the trunk space, and ensures large opening area in the roof while the cover member is stored.

SUMMARY OF THE INVENTION

First this invention disclose a storage structure for storing a cover member of a sliding roof type vehicle comprising:
(a) a cover member for covering foldably an opening section formed in the roof of a vehicle;
(b) first rails for guiding the opening or closing of the cover member, provided at the right and left sides of the opening section;
(c) a tray for placing the cover member in folded state, installed at the rear of the first rails; and
(d) a storage means for storing the tray, installed at the rear of the backseat of the vehicle.

In the above-mentioned storage structure for storing a cover member of a sliding roof type vehicle, the tray is maintained in turnable state by a retaining means for supporting the tray, and transferred to the storage means when the tray is turned to a specified angle and thus the retaining means is released.

The storage means constitutes second rails installed on both sides of the vehicle that extends downward from the rear end of the tray, or the storage means has the second rails and a storage box installed at the bottom of the second rails.

Also this invention disclose another storage structure for storing a cover member of a sliding roof type vehicle comprising:
(a) a cover member for covering foldably an opening section formed in the roof of a vehicle;
(b) first rails for guiding the opening or closing of the cover member, provided at right and left sides of the opening section;
(c) a tray for placing the cover member in folded state, installed at the rear of the first rails;
(d) a sliding means for sliding the tray from the position where the cover member is folded to the storage position at the rear;

(e) an oscillating means for supporting the tray, while maintaining the tray in oscillatory state at the storage position, and releasing the tray at a specified angle; and (f) a storage means for storing the tray, which is released from the oscillating means, in a storage position within a compartment;

wherein the tray is slid by the sliding means from the folded position to the storage position, rotated by the oscillating means, and stored at the storage position within the vehicle.

The sliding means of the above-mentioned storage structure is comprised of a shaft that crosses the tray, a support part mounted to the vehicle for supporting the shaft, and first drive means for transferring the tray between the folded position and the storage position along the shaft.

The sliding means of the above-mentioned storage structure further comprising first engaging part, which is provided at the end of the first rails, and second engaging part, which is engaged with the first engaging part, provided at the front part of the tray, and the tray is positioned at the folded position.

The oscillating means of the above-mentioned storage structure is comprised of the shaft, support part, and the second drive means for rotating the tray, the shaft being released from the support part when the tray is rotated up to a specified angle by the second drive means.

The storage means of the above-mentioned storage structure is comprised of a storage box for storing the tray installed within the vehicle, second rails for guiding the tray released from the support part to the storage position within the storage box, and the third drive means for transferring the tray along the second rails to the storage position.

Also the storage means is laid along the rear side of the seatback of the passenger seat at the rear end of the vehicle to transfer the tray to the storage position.

The tray comprises the rear edge of the roof of the vehicle, and the rear bottom of the tray is directly and the tray may be closely connected to the top of the closed rear window glass at the folded position.

In this case, the tray is comprised of storage rails laid out along the first rails at the folded position, and the storage rails are disengaged from the first rails at the tray storage position.

In the both above-mentioned storage structures, the cover member is made of canvass.

DETAILED DESCRIPTION OF THE EMBODIMENTS

Figure 1:
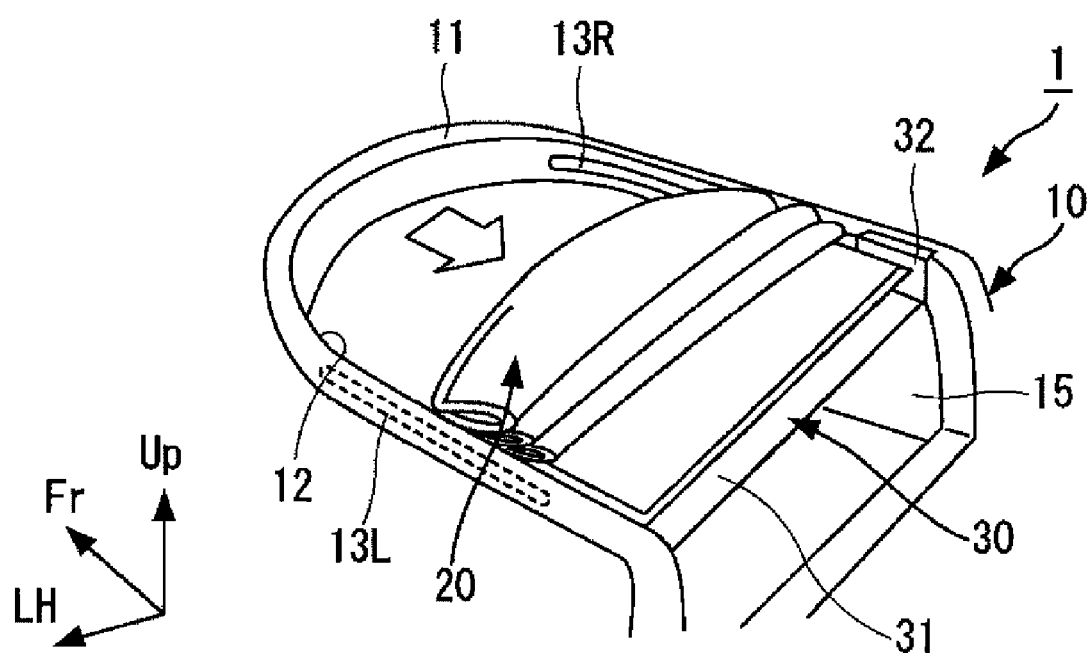
FIG. 1 is a perspective view of the rear part of a vehicle featuring a storage structure for a cover member of a sliding roof type vehicle related to the first embodiment of this invention.

Embodiments of the invention are described as follows based on the drawings.

The arrow marked as "Fr" in the drawing indicates the front of the vehicle, while "Up" indicates the top and "LH" the left-hand side of the vehicle.

First Embodiment

FIG. 1 shows a partial perspective view of a storage structure for storing a cover member of a sliding roof type (hatchback type) vehicle 10 related to the embodiment of this invention.

This vehicle 10 has an opening section 12 in its roof 11. This opening section 12 has been formed by cutting the area from the rear end to the front end of the roof in an arch-like shape, with the edges on both sides left as they are. This opening section 12 can be covered by a cover member 20, or left open, wherein the cover member 20 is foldable. For example, when the vehicle is parked or it is raining, the opening section 12 of the roof 11 is entirely covered by a cover member 20, and when driving, the driver has a sense of freedom with the opening section 12 opened by folding the cover member 20.

Figure 2:
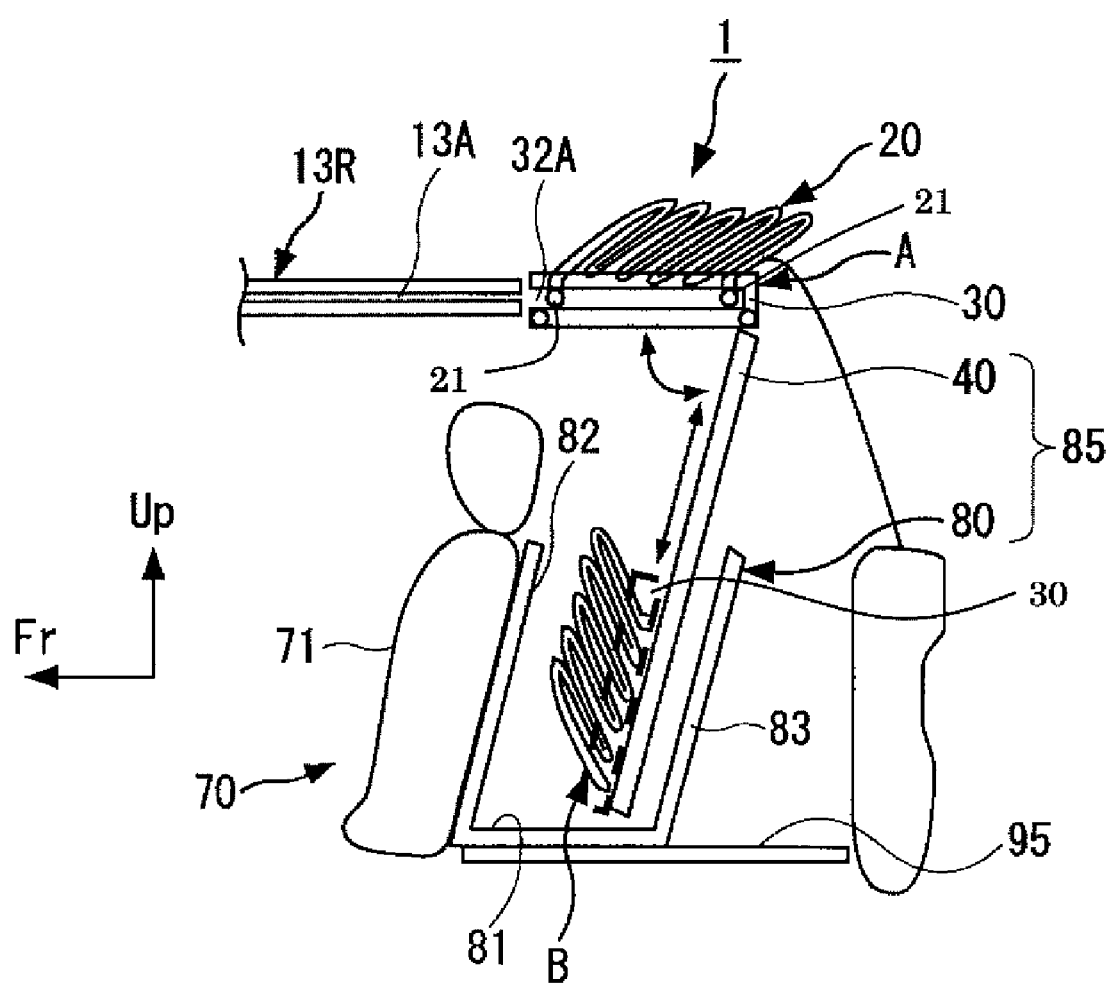
FIG. 2 is a schematic cross-sectional view of the rear part of the vehicle in FIG. 1.

The cover member 20 is equipped, as its part is shown in FIG. 2, with multiple rods 21, which extend outward in the width direction, placed at specified intervals in the longitudinal direction of the vehicle. The tip of each rod 21 protrudes from the right or left edge of the cover member 20 outwards in the width direction of the vehicle. The first rails 13L, 13R for guiding the tip of these rods 21 are provided along the right and left roof edges, which extend in the longitudinal direction of the vehicle, of the opening section 12 respectively.

The cover member 20 is supported by the first rails 13L, 13R and slides along the first rails 13L, 13R on the roof in front-and-rear direction of the vehicle. The cover member 20 is folded through a process in which the cloth between rods adjacent to each other is folded in mountain fold when the front and the rear edges of the cover member 20 are moved closer to each other. By folding the cover member 20 while moving it toward the rear side of the vehicle, an opening section 12 is formed.

As shown in FIG. 2, the storage structure for storing the cover member of a sliding roof type vehicle of this invention is structured to allow the cover member 20 to be transferred into a storage box 80 in a vehicle interior installed at the back of the rear seat 70.

In order to store the folded cover member 20 into a storage box 80, the storage structure 1 for the cover member of a sliding roof type vehicle of this invention is provided with a tray 30, second rails 40, retaining means 50 for supporting the tray 30, and a storage box 80. The cover member 20 is placed on this tray 30 to be transferred in folded state. As shown in FIG. 2, the tray 30 can be transferred between the first position A at the rear end of the first rail 13R on the roof 11 and the second position B in the storage box 80, which is lower and slightly to the front of the vehicle than the first position A. It is preferable in terms of strength to attach the second rails 40 along a rear pillar (not shown). Therefore, the first and the second positions A and B are preferably provided in a vertical direction along the inner side of the rear pillar (not shown).

As shown in FIG. 1, the tray 30 is provided with a base plate 31, whose longitudinal side extends in the width direction of the vehicle, substantially as wide as the left and right width of the cover member 20, and extended rails 32, 32 provided in a concave shape in the inside part at the right and left sides of the base plate 31, and has such an area composed of width and depth capable of storing the entire folded cover member 20. The dimensions of the base plate 31 are determined so that the base plate 31 extends horizontally under the entire area of folded cover member.

The extended rails 32, 32 provided in a concave shape in the inside part at the right and left sides of the tray 30 are used for receiving and guiding the tips of the rods 21, which protrude from the right and left edges of the cover member 20, respectively. In a state in which the tray 30 is retained at the first position A by the retaining means 50, which is to be described later (FIG. 2), the extended rails 32, 32 are placed behind the first rails 13L, 13R at the same height as the first rails 13L, 13R. Furthermore, in a state in which the tray 30 is retained at the first position A, an extended guide groove 32A, which is connected to the guide groove 13A of the first rails 13L, 13R, is formed on the extended rails 32, 32, as shown in FIG. 2. The edge of each rod 21 can be transferred along these guide grooves 13A, 32A.

The rods 21A mounted to the back end of the cover member 20 are fastened to the tray 30. The extended guide groove 32A of the extended rail 32 extends to the middle of the extended rail 32 slightly to the rear of the vehicle, and the rods 21A mounted to the rear end of the cover member 20 are fastened at the position of the rear end of this extended guide groove 32A.

Figure 3:
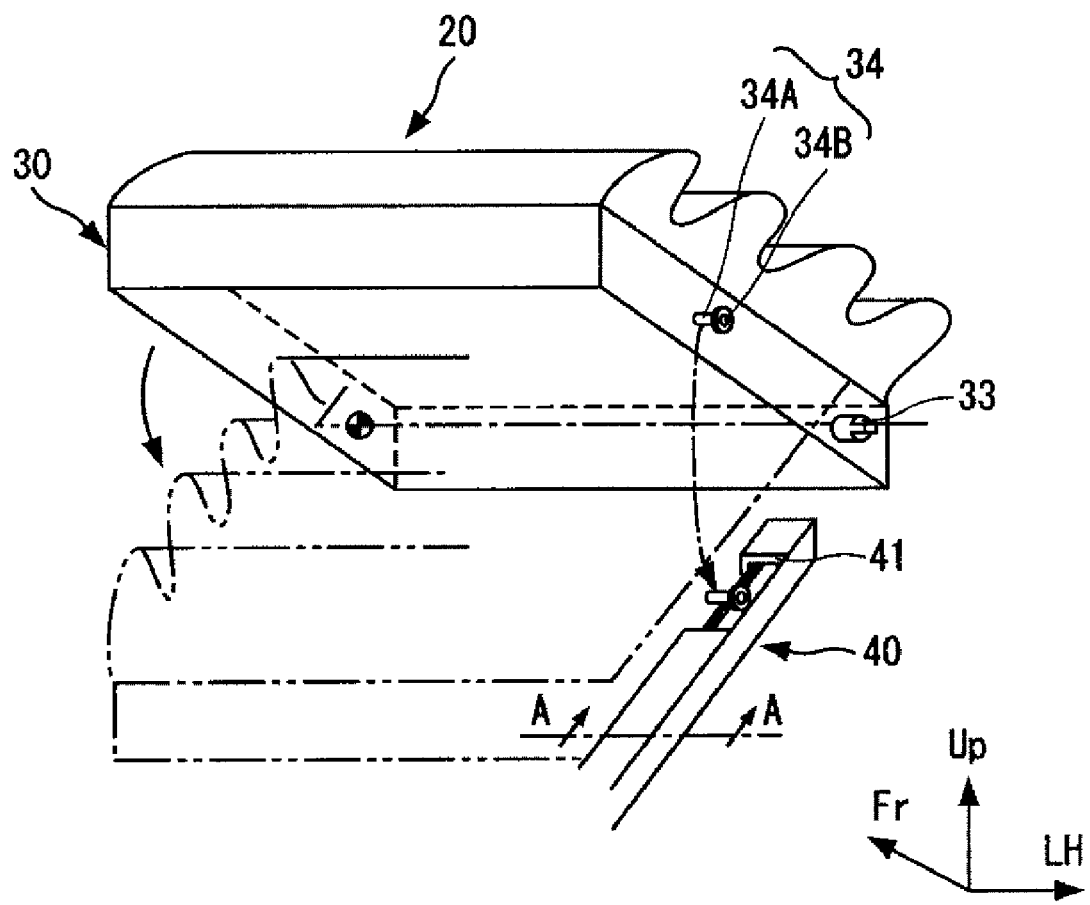
FIG. 3 is a perspective view of a tray and the second rails of a storage structure for a cover member of a sliding roof type vehicle.

As shown in FIG. 3, the first convex 33 and second convex 34, which protrude outward in the width direction of the vehicle, are provided apart from each other in the left and right outside parts of the tray (30). FIG. 3 schematically shows the cover member 20 and the tray 30.

To guide and support the first convex 33 and second convex 34, second rails 40 are provided slightly inclined to the vertical direction.

As shown in FIG. 2, the second rails 40 are provided on the internal wall at the rear of the vehicle 15, and extends inclined from the upper end position adjacent to the rear end of the roof 11 forward and downward, and its lower end extends almost to the floor.

Figure 4:
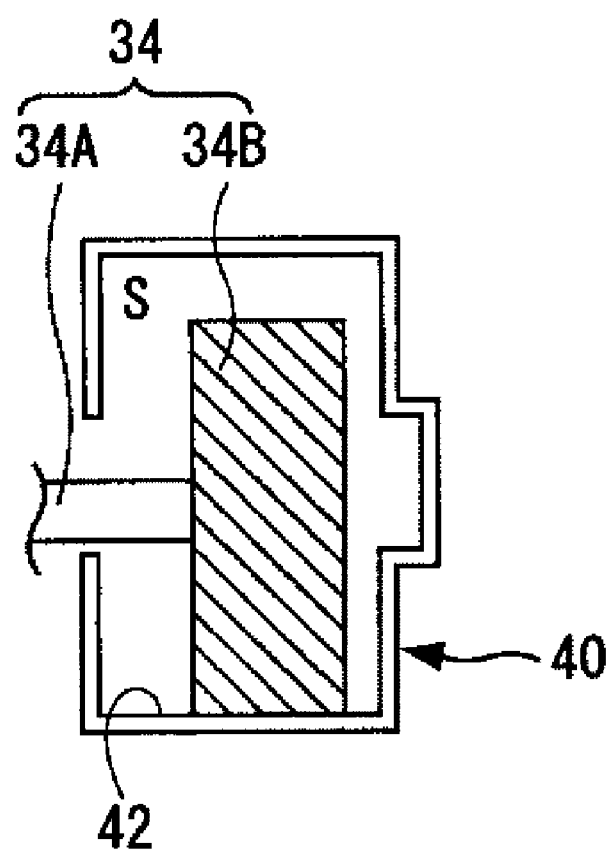
FIG. 4 is an A-A cross-sectional view of FIG. 3.

As shown in FIG. 4, the second rails on each side 40 are formed so that their cross section forms U shape, and the first convex 33 and the second convex 34 are transferred within this U shape S. In this embodiment, the dimensions of the second rails 40, 40 are determined, and the second rails 40, 40 are mounted to a desired position on the internal wall 15, so that the tray 30 can be transferred diagonally, guided by the second rails 40, from the first position A, which is on the surface of the roof, to the second position B, which is nearer to the front of the vehicle and lower than the first position A.

The retaining means 50 is used to retain the tray 30 at the upper end of the second rails 40 in a releasable state, and is provided in a series behind the first rails 13R, 13L attached to the left and right edges of the roof. The tray 30 is retained horizontally at the first position A at the rear end of the roof 11 by the retaining means 50.

To achieve this, the retaining means 50 is provided with a receiving member 51, which holds the first convex 33 in rotatable and detachable state, and the locking member 52, which locks the second convex 34 in a detachable state.

Figure 5:
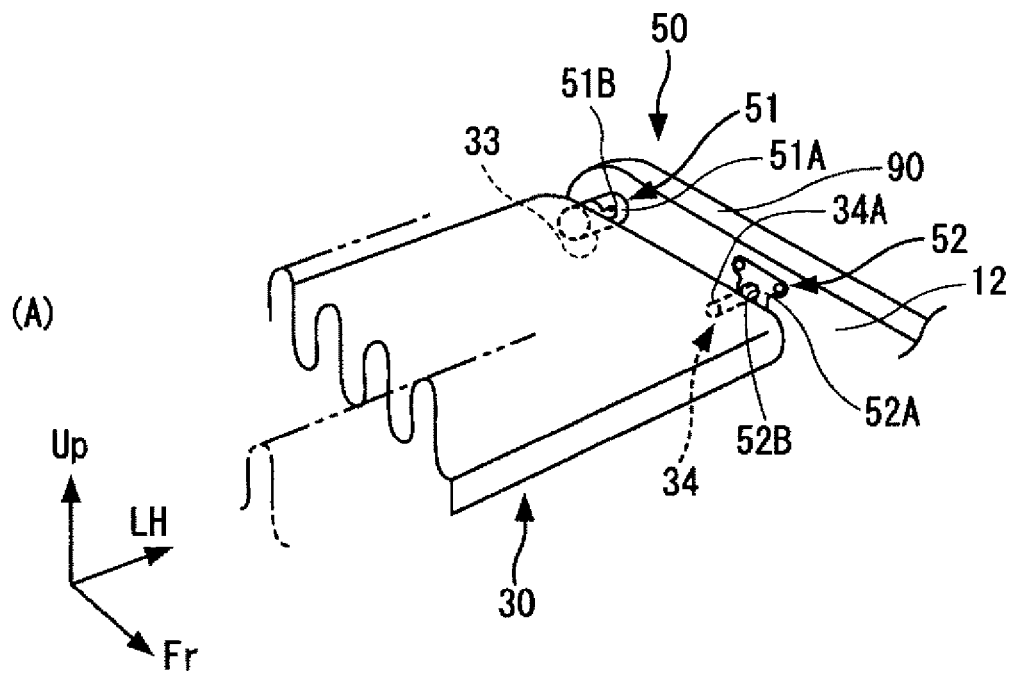
FIG. 5 is a perspective view of a retaining means in a storage structure for a cover member of a sliding roof type vehicle.
Figure 5:
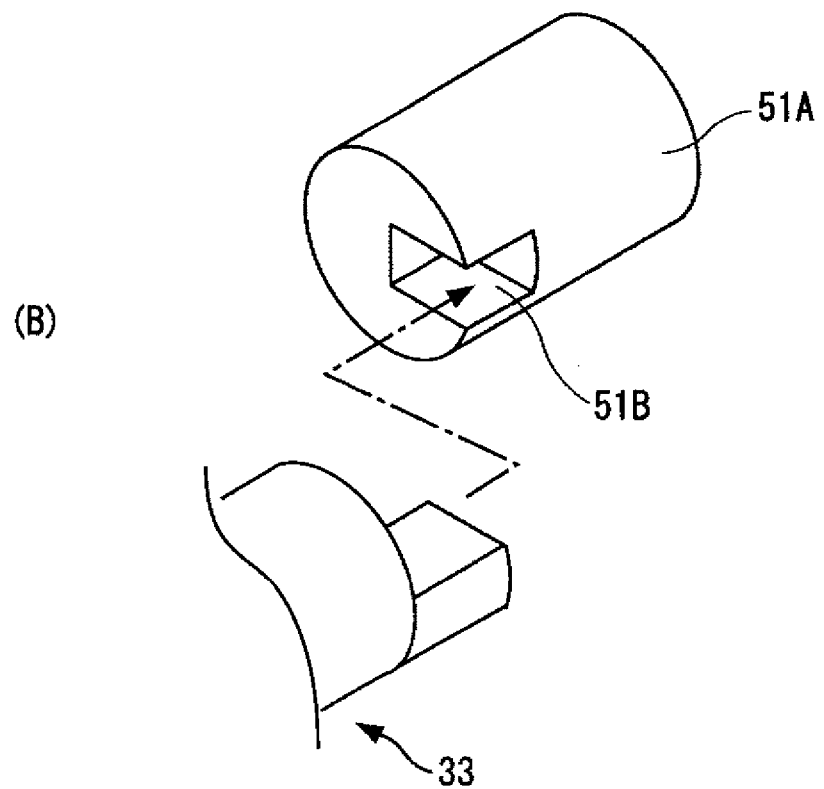

As shown in FIG. 5(B), the receiving member 51 is provided with a cylindrical rotating part 51A, which is mounted to the vehicle body 90 so that rotation is allowed. The rotating part 51A has a cutout in a rectangular form 51B, which extends in the radial direction from the center of the cylindrical rotating part 51A. To match this cutout 51B, the first convex has a pin at the end whose cross-sectional area is rectangular. The tray 30 can thus be rotated around the rotating part 51A as the center of rotation, in a state in which the first convex 33 is kept inserted into the cutout 51B. By sliding the first convex 33, which has been inserted into the cutout 51B, toward the trimmed edge of the cutout 51B, the tray 30 can be detached from the receiving member 51.

The locking member 52 is fastened to the vehicle body 90 at the position horizontally away from the rotating part 51A toward the front of the vehicle. The locking member 52 is comprised of a small piece 52A, which faces the side of the tray 30, and a hole 52B, which is created by cutting off from the bottom up to the middle of the upper portion of the small piece 52A. The second convex 34 is provided with a shaft 34A, whose cross-sectional area is made round to match the hole 52B. The hole 52B is designed so the area around the inlet is smaller than the diameter of the shaft 34A, thus allowing the shaft 34A to enter the hole 52B as a result of the deformation of the small piece 52A itself (not shown). Consequently, while the locking member 52 supports the shaft 34A in the hole 52B, the rotation of the tray 30 around the rotating part 51A is controlled. On the other hand, the shaft 34A supported by the hole 52B is lowered, expanding the width of the inlet of the hole, and when the shaft 34A is detached from the hole 52B, the tray 30 is allowed to rotate around the rotating part 51A.

In this embodiment, a roller 34B is mounted to the tip of the shaft 34A. When the shaft 34A is detached from the locking member 52 and the tray 30 is rotated, a roller insertion port 41 is formed, as shown in FIG. 3, at the position where the roller 34B touches the second rail 40. The second convex 34 thus detached from the locking member 52 enters the second rail 40, and the second convex 34 is transferred on the internal bottom face of the second rail 40 with the rotation of the roller 34B.

The receiving member 51 is installed in the vehicle body 90 so it is rotated within the second rails 40. The first convex 33 detached from the receiving member 51 also moves along the second rails 40.

The tray 30 detached from the receiving member 51 moves along the second rails 40, and stored in a storage box 80.

The storage box 80 for storing the tray 30, with the cover member 20 placed on it, is designed substantially in a rectangular shape with open top. As shown in FIG. 2, this storage box is comprised of a bottom plate 81, which is fixed to the deck 95 at the back of the vehicle with bolts, front wall 82, which erects from the front edge of the bottom plate 81, and the rear wall 83, which erects from the rear edge of the bottom plate 81. Although side walls on both sides of the storage box 80 may be provided, this embodiment uses the internal wall surface at the rear of the vehicle. Since the storage box 80 is installed adjacent to the back of the rear seat 70, the front wall 82 and rear wall 83 comprising the storage box are set, inclined at the same angle as the seat back 71. The rear seat 70 is not provided with a reclining mechanism, but its angle of inclination is fixed.

The tray 30 is stored between the front wall 82 and the rear wall 83. It is desirable that the storage box 80 has a lid to protect the contents (not shown).

The operations of the storage structure for a cover member of a sliding roof type vehicle related to the embodiment of this invention are described below.

To open the opening section 12 of the roof 11, the cover member 20 is slid toward the rear side of the vehicle as in the case of conventional sliding roof type vehicles (see FIG. 1). In this case, the cover member 20 is folded from the front to the rear end and placed on the tray 30 located toward a rear end of the roof. The position of the tray 30 is controlled by the retaining means 50, so that the tray 30 is maintained at the first position A at the rear end of the roof 11. If a user presses down the tray 30, the second convex 34 engaged in the locking member 52 is disengaged, allowing the tray 30 to rotate around the receiving member 51. The second convex 34 disengaged from the locking member 52 moves with the rotation of the tray 30, enters from the roller insertion port 41 into the second rails 40, and is supported. The tray 30 moves downward because of its own weight, and the first convex 33 is disengaged from the receiving member 51. The tray 30 then moves into the storage box 80 along the second rails 40.

The storage structure for a cover member of a sliding roof type vehicle thus configured allows the cover member 20, which is folded as a result of opening section of the roof 11, to be transferred from the roof 11 into the inside of the vehicle, and the tray 30 having the folded cover member 20 on it can be stored in the storage box 80 on the deck 95. Since the folded cover member 20 can be prevented from being seen from outside the vehicle, favorable appearance of the vehicle can be ensured, while passengers of the vehicle can feel the openness thanks to the enlarged open area in the roof 11.

Since the storage box 80 for storing the tray 30 is installed on the front side of the deck closely adhered to the rear seat 70, a space for storing baggage is ensured on the deck 95.

Various embodiments are allowed with this invention within the range in which the aspects of the invention are not deviated. The above description applies to the configuration in which the second rails extend from the first position A at the rear end of the roof to the second position B for storing the tray, which is lower and slightly to the front of the vehicle than the first position in a vehicle interior. However, the second position B may be directly below the first position A or at a place closer to the rear of the vehicle than the first position. As described above, the second rails may preferably be provided along rear pillars (not shown) of a vehicle. The storage box may also be installed on the deck apart from the rear seat In this embodiment, the tray is stored in the storage box installed within the cabin at the back of the vehicle, but the storage box may not necessarily be installed. For example, the tray may be stored placed on the deck.

When the tray 30 is moved from the first position A at the upper end to the second position B at the lower end, if the tray (30) is biased toward the roof 11 with such a biasing means such as a spring, rapid fall of the cover member 20 by its own weight can be prevented, and rather the tray 30 can be manually moved gently. When the tray 30 is also moved from a stored position to the first position A, the labor can be saved for lifting the tray 30. Here, folding and extending operations of the cover member 20 or vertical operation of the tray 30 is done by electrical motor drive instead of manual operation, it is much more convenient.

Second Embodiment

Figure 6:
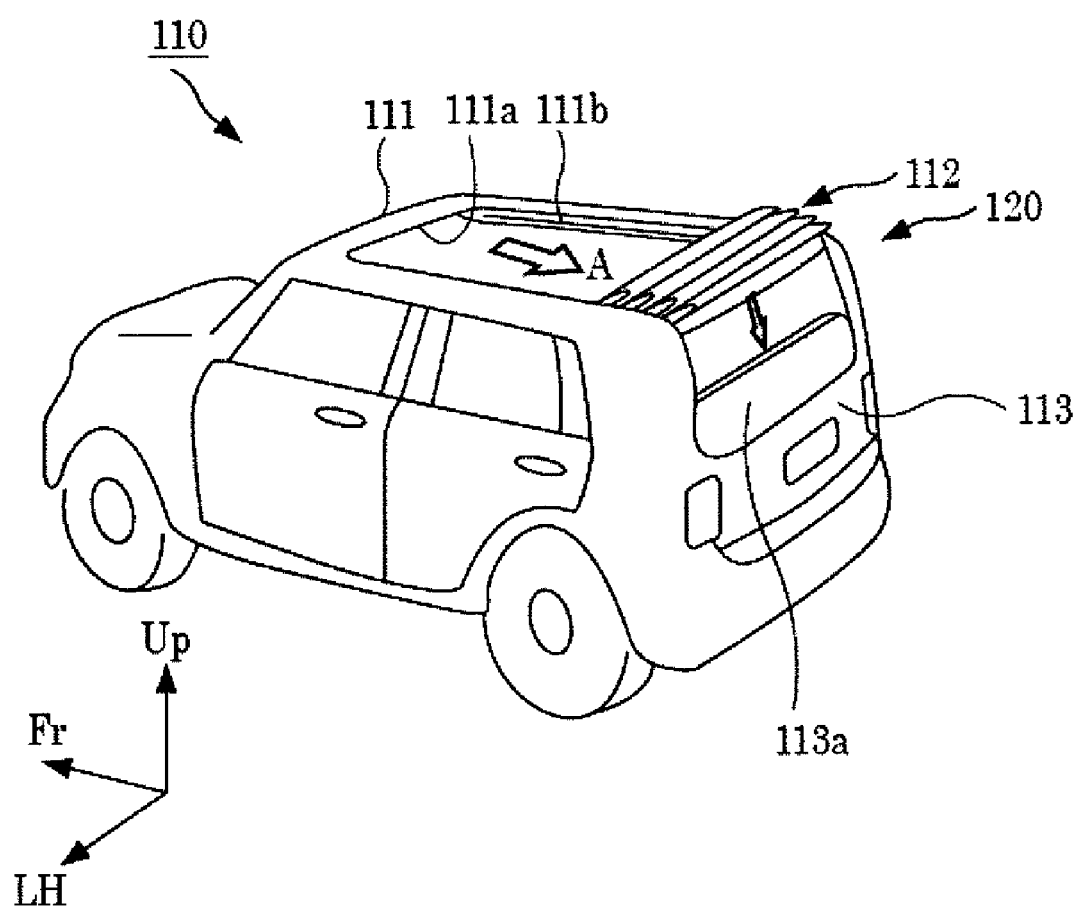
FIG. 6 is a schematic perspective view of a vehicle equipped with the second embodiment of the storage structure for a cover member of a sliding roof type vehicle of this invention.

FIG. 6 shows the second embodiment of the storage structure for a cover member of a sliding roof type vehicle of this invention.

The vehicle 110 has a roof 111 provided with an opening section 111a. This opening section 111 a is formed by cutting the area from the rear end to the front end of the roof in an arch-like shape, with the edges on both sides left as they are. This opening section 111a is covered with a foldable cover member 112.

The cover member 112 is provided with multiple rods (not shown), which extend toward the width direction of the vehicle, installed away from each other in the longitudinal direction. The end of each rod extends outward from the edge on the right and left sides of the cover member in the width direction of the vehicle. The first rail 111b for guiding the end of these rods is installed along the right and left edges of the opening section 111a that extend in the longitudinal direction of the vehicle. A sliding member (not shown) mounted to the end of each rod is guided and supported by the first rail 111b.

The cover member 112 is supported by the first rail 111b and slides along the first rail 111b on the roof in front-and-rear direction of a vehicle. The cover member 112 is folded as a result of folding of the material between the rods adjacent to each other when the front and the back ends of the cover member are brought closer.

In such a configuration, by transferring the cover member 112 toward the rear side of the vehicle and thus folding, for example, in mountain fold in the direction of arrow A (see FIG. 1), the opening section 111a is formed.

In this embodiment, the folded cover member 112 is stored in the cover member storage structure 120 within the cabin of the vehicle 110.

Figure 7:
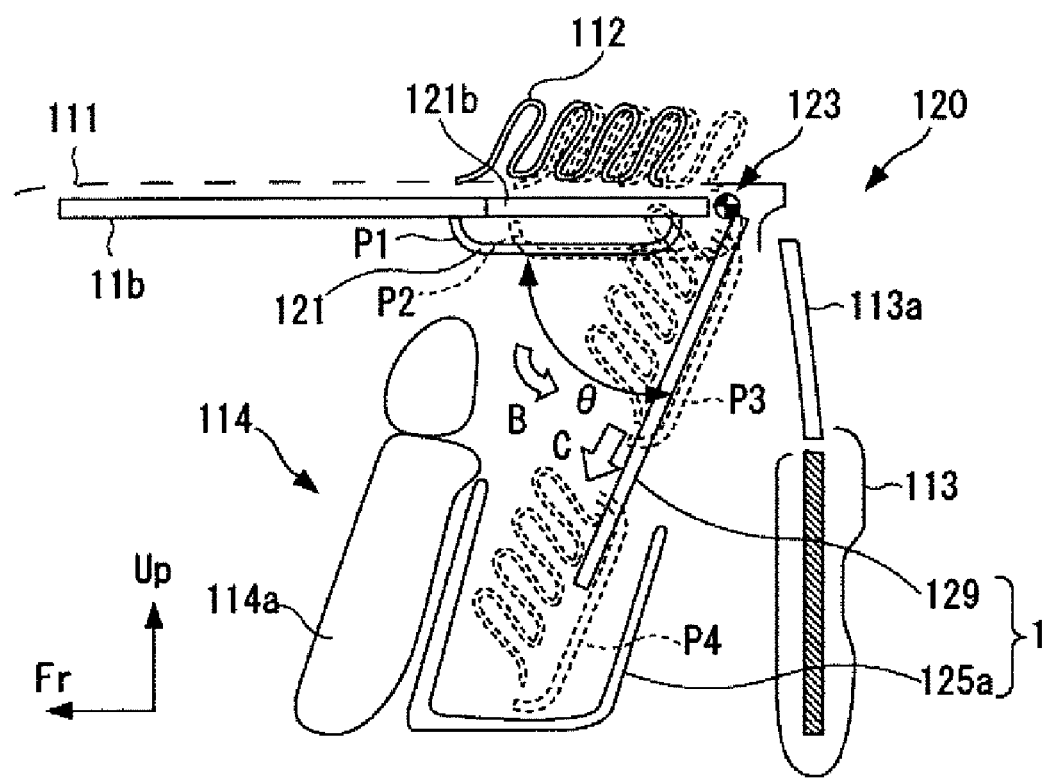
FIG. 7 is a schematic cross-sectional view of the storage structure shown in FIG. 6.

As shown in FIG. 7, the cover member storage structure 120 includes a tray 121 for placing the folded cover member 112 on, sliding means 112 (see FIG. 10) for sliding the tray 121 in the longitudinal direction, oscillating means 124 for oscillating the tray 121 around the rocking shaft 123, and storage means 125 for storing the tray 121 in the storage position within the vehicle.

The tray 121 extends along almost the entire width of the roof 111 so that the cover member 112 can be placed on it. In a state in which the folded cover member 112 is placed on it, the tray 121 transfers the cover member 112, while oscillating, from the folded position P1 to the storage position P4 by the sliding means 122 as described in (1) to (3) below.

Figure 9:
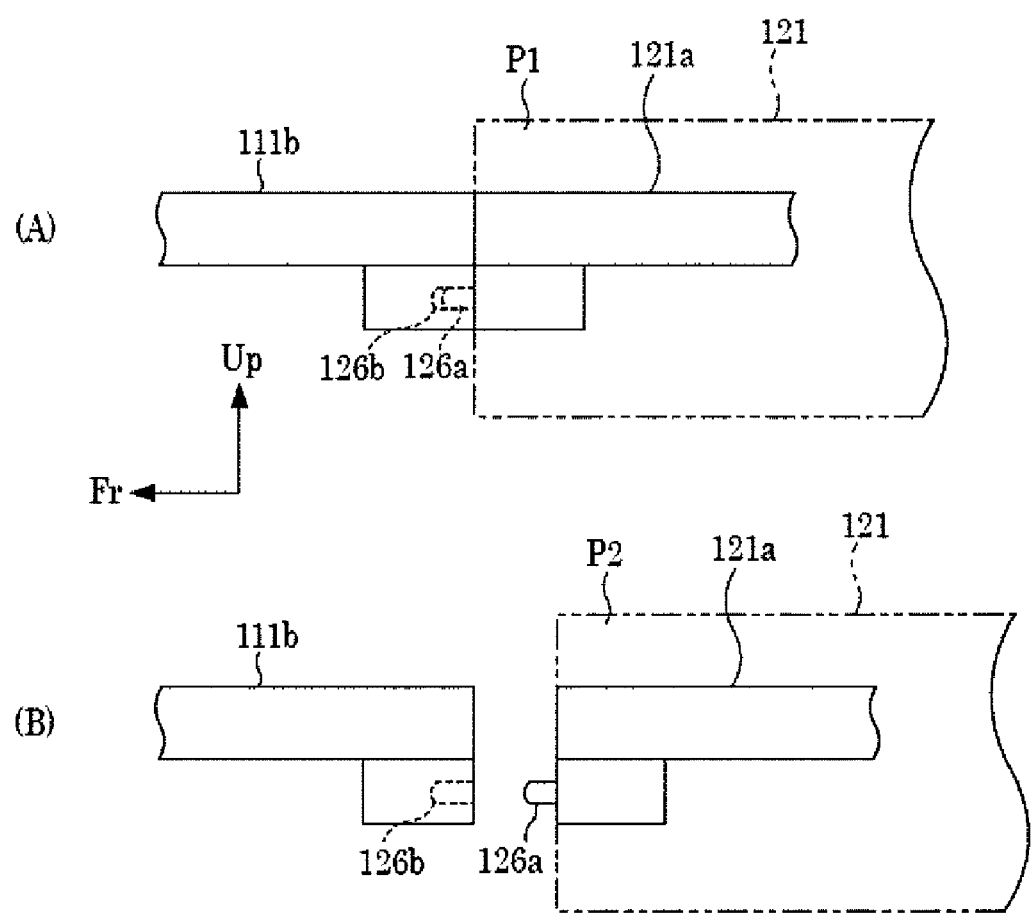
FIG. 9 (A) is a schematic side view of engaged state of the first rail and the storage rail in the storage structure in FIG. 6, while (B) is a schematic side view of disengaged state.

(1) As shown in FIGS. 7 and 9, the tray (121) moves between the folded position P1 on the roof 111 and the retracted position P2, which is to the rear than the folded position P1.

(2) The tray 121 is supported at the retracted position P2 by the oscillating means 124, being allowed to oscillate in the direction shown by the arrow B around the rocking shaft 123. The tray 121 is rotated, with its front going down by angle θ, and then oscillated from the horizontal retracted position P2 to the slanted oscillating position P3. At this oscillating position P3, the tray 121 is detached from the oscillating means 124.

(3) After being detached from the oscillating means (124) at the oscillating position (P3), the tray (121) moves in the direction of the arrow (C) by the storage means (125), and is transferred to the storage position (P4) at the bottom.

As shown in FIG. 7, the outer surface of the rear part of the tray 121 constitutes the rear edge of the roof 111 at the folded position P1. When the rear window glass 113a on the rear door 113 is closed, the top edge of the rear window glass 113a contacts the back end of the tray 121 in watertight state. The bottom face of the tray 121 constitutes a part of the ceiling of the cabin at the folded position P1.

Figure 8:
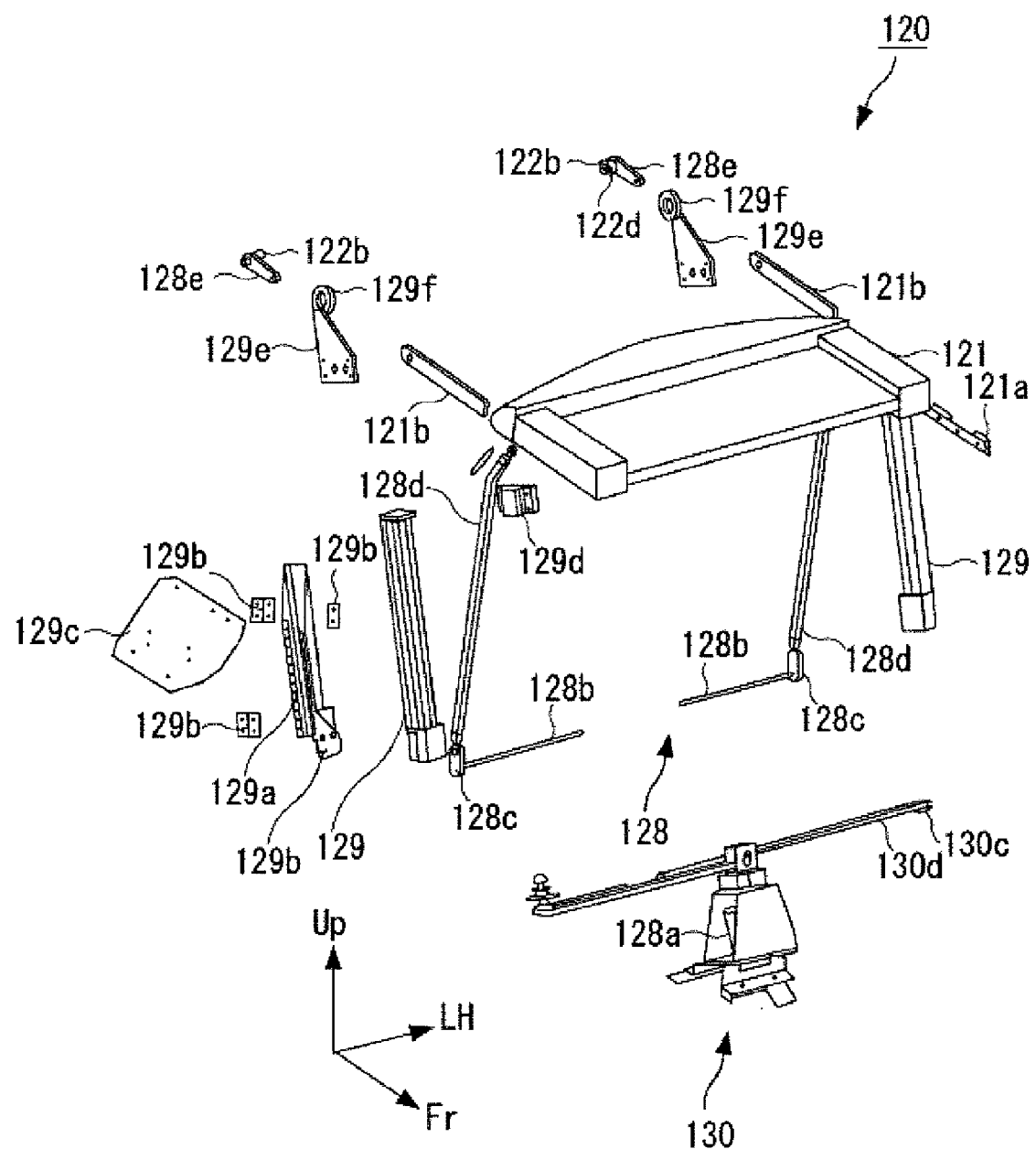
FIG. 8 is an exploded perspective view of the components of the storage structure in FIG. 6.

FIG. 8 shows a detailed view of the storage structure for a cover member of a sliding roof type vehicle in the second embodiment of this invention 120. In FIG. 8, the tray 121 is configured as a flat rectangular shape whose longitudinal sides extend in the width direction of the vehicle, and storage rails 121a, 121a, which extend in the longitudinal direction of the vehicle, are provided along both sides of the vehicle. The end of the storage rail 121a is aligned with the rear end of the first rail 111b when the tray 121 is at the folded position P1.

As shown in FIG. 9A, when the first engaging part 126a, which is provided at the bottom end of the storage rail 121a (illustrated as a boss in this embodiment), is engaged with the second engaging part 126b (illustrated as a engagement hole in this embodiment), the front end of the storage rail 121a is aligned with the rear end of the first rail 111b, and thus the first rail 111b and the storage rail 121a are connected.

Meanwhile, as shown in FIG. 9(B), when the first engaging part 126a of the storage rail 121a is detached from the second engaging part 126b of the first rail 111b, the tray 121 is allowed to move from the folded position P1 to the retracted position P2. Since the tray 121 is retracted, the first rail 111b does not interfere with the storage rail 121a when the tray 121 is oscillated at the oscillating position P3.

This storage rail 121a is mounted to the both edges of the tray 121 via the rail-fixing base 121b.

Figure 10:
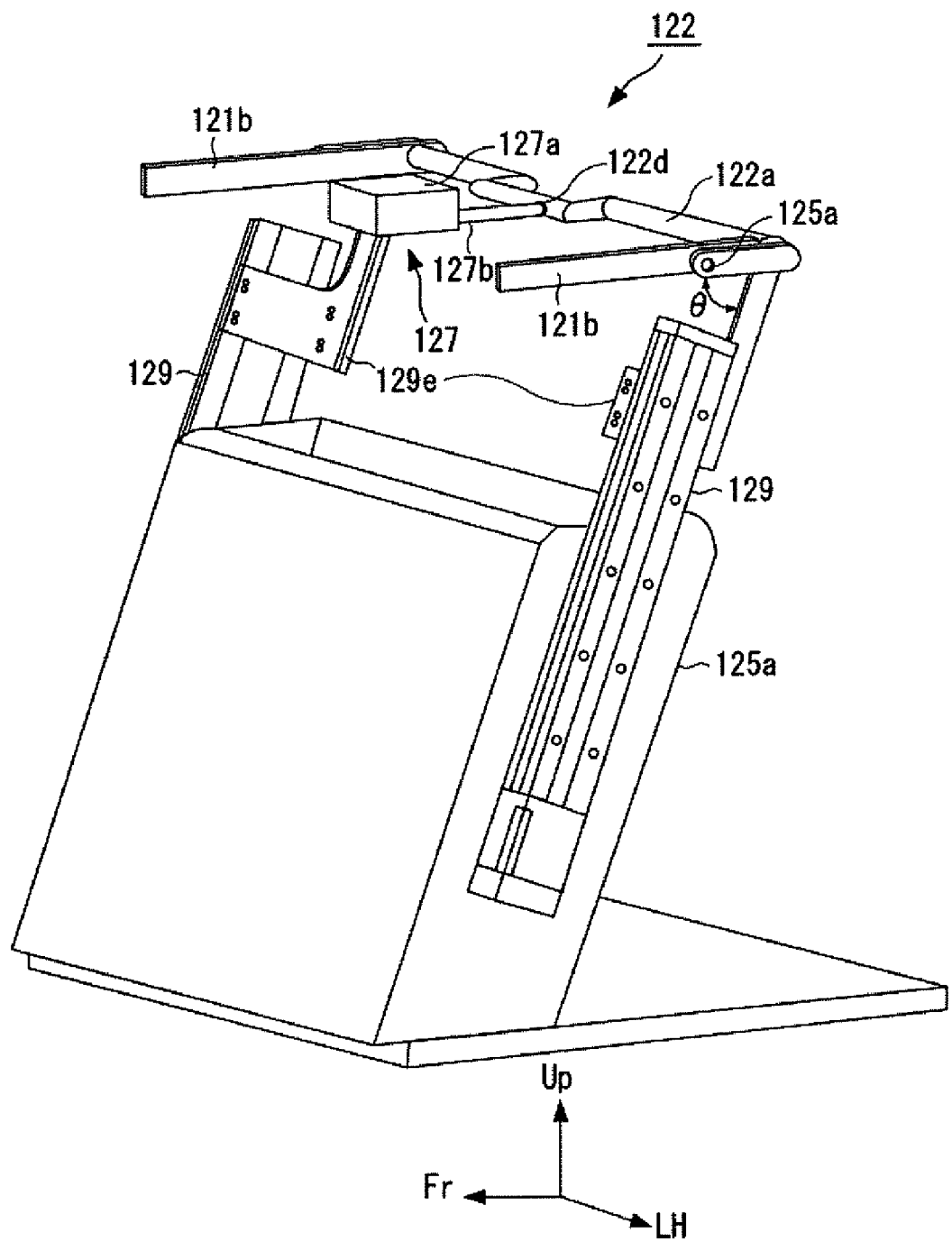
FIG. 10 is a schematic perspective view of the storage structure in FIG. 6.
Figure 11:
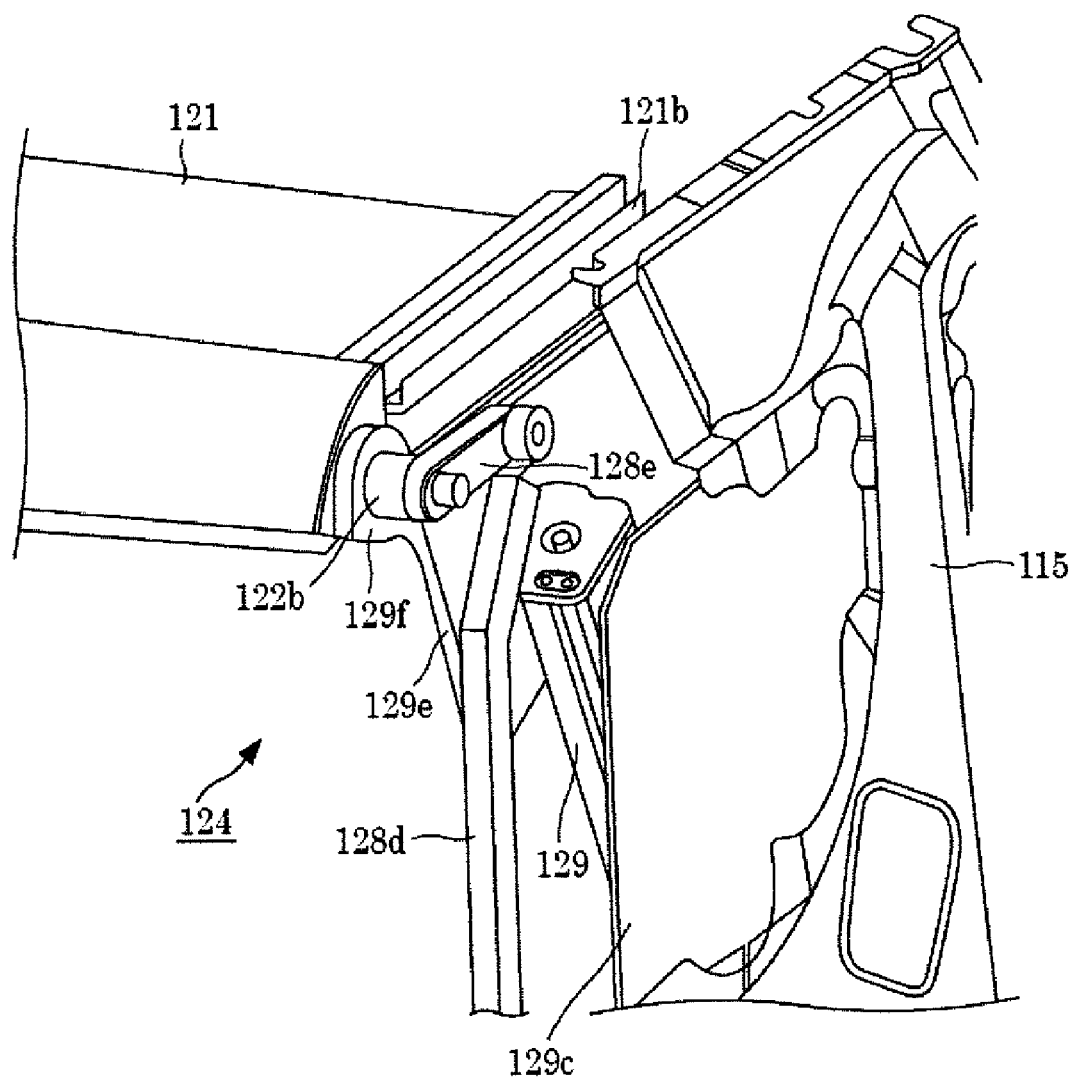
FIG. 11 is an enlarged perspective view from the upper rear side, displaying the main section of the tray in FIG. 6.

As shown in FIGS. 10, 11, and 12, the sliding means 122 is comprised of a shaft 122a, which crosses the tray 121 in the width direction of the vehicle, a support part 122b, which supports the shaft 122a from both sides, and the first drive means 127, which transfers the tray 121 in the front-back direction with respect to the shaft 122a.

The shaft 122a is provided within the tray 121, and when the tray 121 is in the folded position P1 or the oscillating position P3, the shaft 122a is maintained at same position, connected to the support part 122b mounted to the vehicle, regardless of the movement of the tray 121. As shown in FIG. 10, this shaft 122a has a crank-like part at the center, with the central part deviated to the front. The shaft 122a can be linear over the entire length unless it does not interfere with other parts.

Figure 12A:
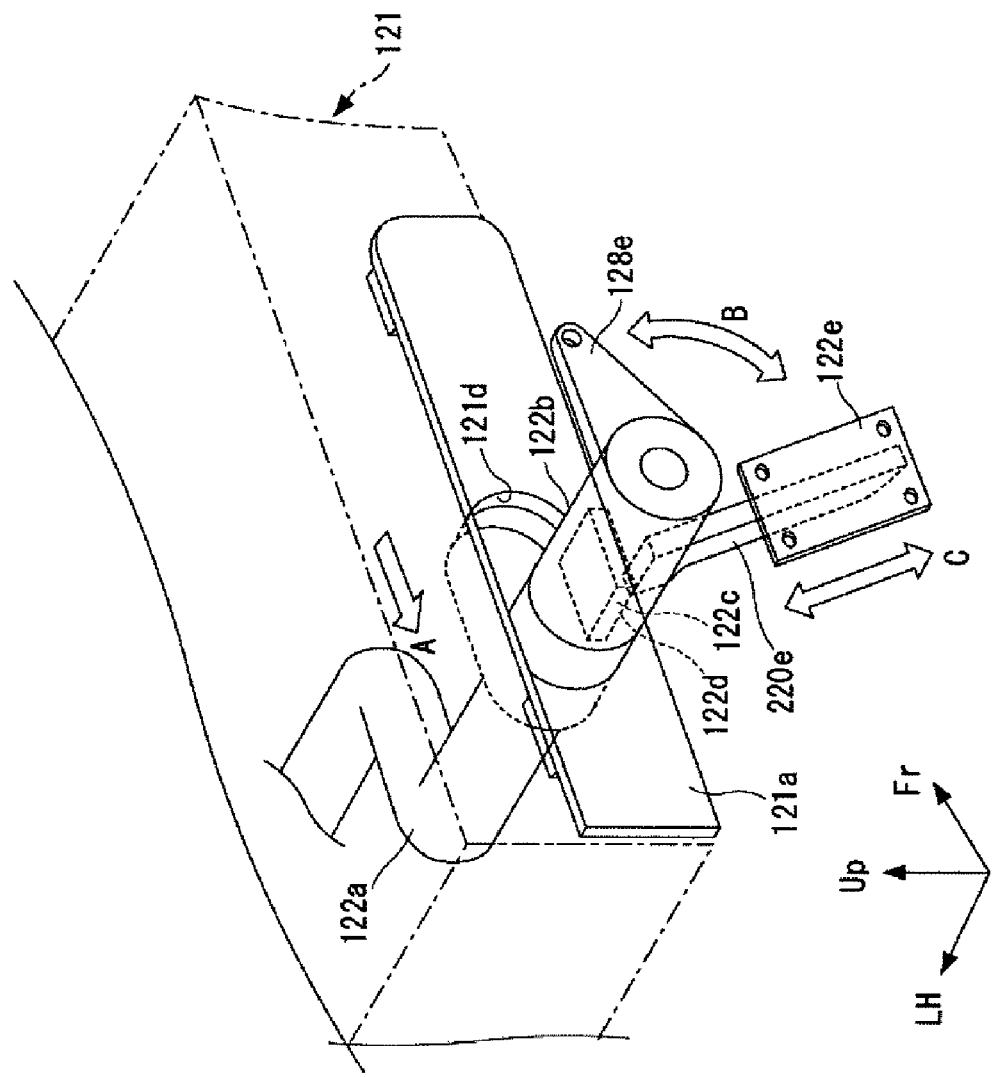
FIG. 12 is an enlarged perspective view of the area connecting the oscillating shaft and the tray of the storage structure in FIG. 6.
Figure 12B:
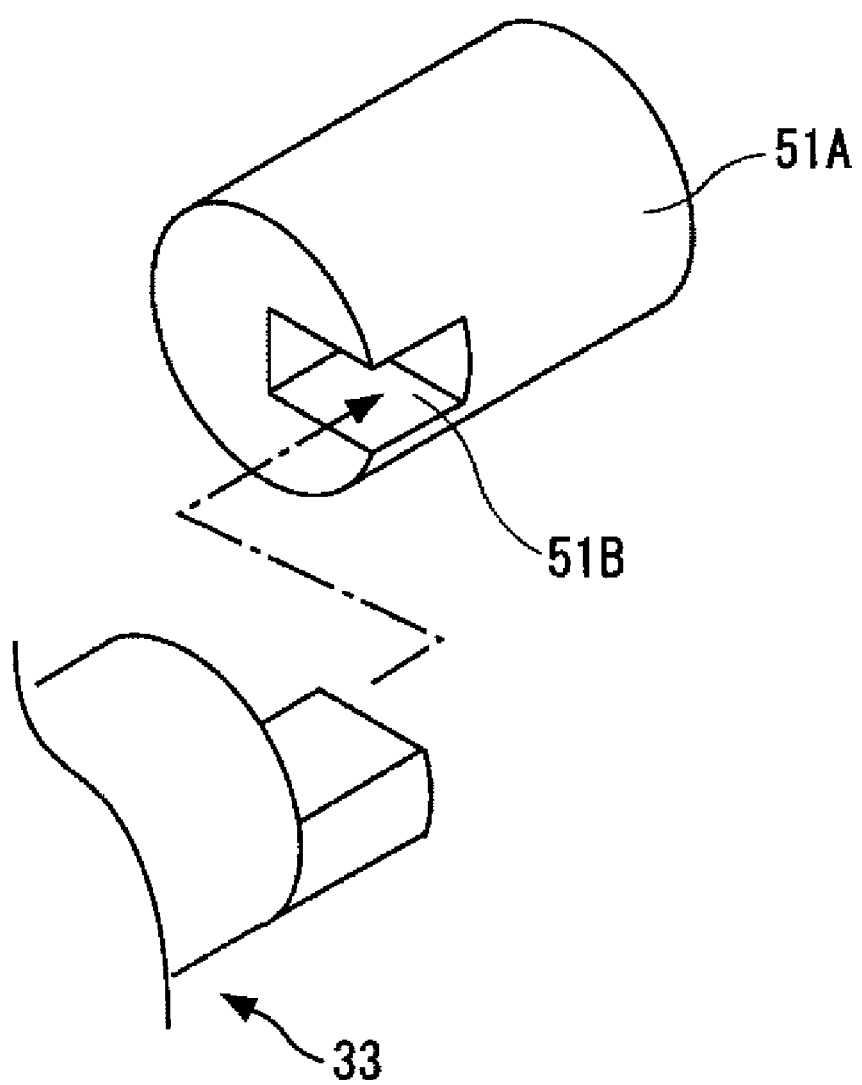
Figure 13:
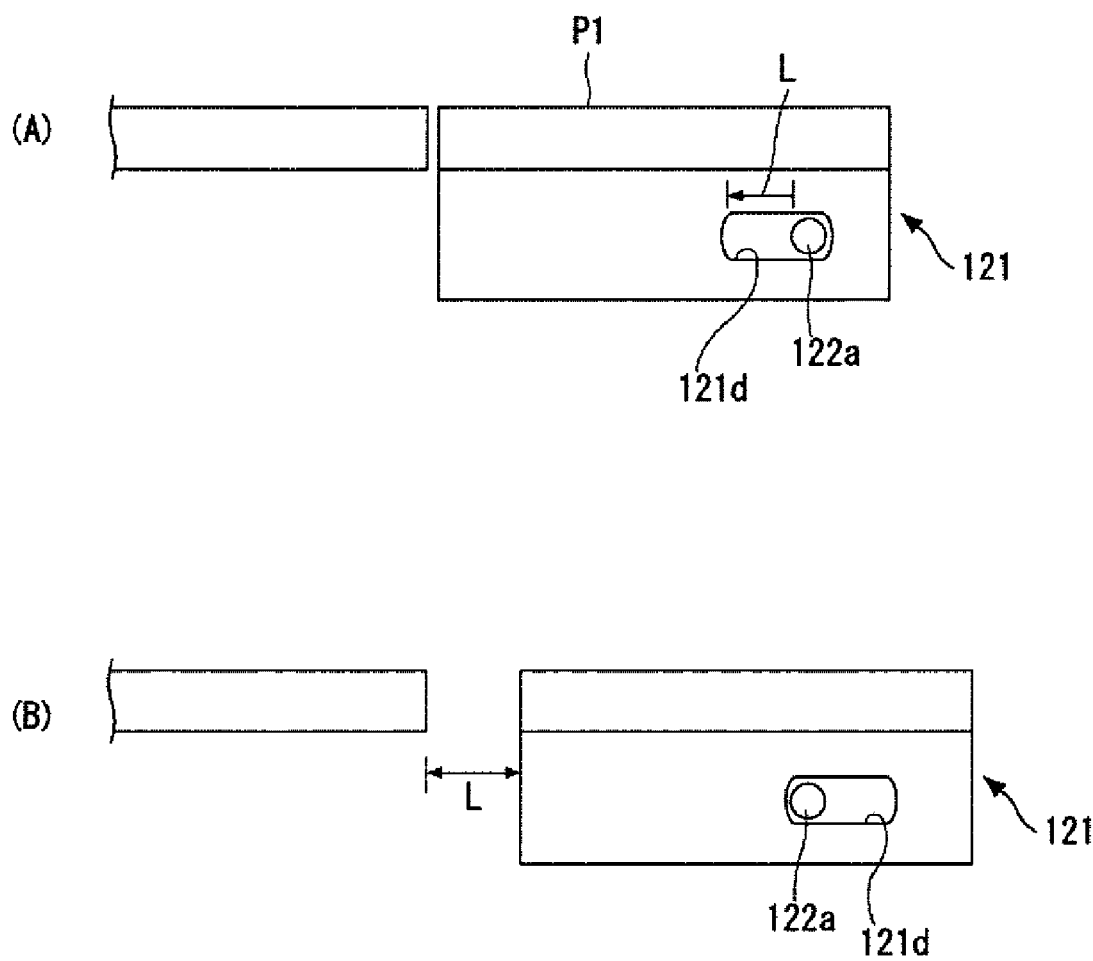
FIGS. 13(A) and (B) display sliding measures of the storage structure in FIG. 6.

As shown in FIGS. 12 and 13, the shaft 122a is passed through oblong holes provided at the both sides at the rear, to allow the tray 121 to move in the front-back direction with respect to the shaft 122a.

The tray 121 moves by the length L from the folded position P1 in FIG. 13(A) to the retracted position P2 in FIG. 13(B).

As shown in FIG. 10, the first drive means 127 is comprised of a driving source such as a motor enclosed in the main unit 127a fixed in the tray 121, and a connecting member 127b driven by that driving source. The connecting member 127b is connected to the center of the shaft 122a.

The driving source of the first drive means 127 drives the connecting member 127b toward the front or the rear. Consequently, the distance between the shaft 122a and the main unit 127a is changed, and the tray 121 is thus transferred. Specifically, the first drive means 127 allows the tray 121 to move the distance between the folded position P1 and the retracted position P2, in a state in which the shaft 122a is supported by the support part 122b.

As shown in FIGS. 11, 12(A) and 12(B), the oscillating means 124 includes the shaft 122a, support part 122b, and the second drive means 128. The shaft 122a and the support part 122b achieve the function of the oscillating means 124. The shaft 122a is provided with a key 122c, which extends in the specified radial direction, at both ends. Meanwhile, the support part 122b is equipped with a key groove 122d shown in FIG. 12(B) at both ends, which allows the support part 122b to be rotated on the vehicle side.

As shown in FIG. 8, the second drive means is comprised of a motor (not shown) installed below the storage position (P4) described above, a rod (128b) driven by the motor, an oscillating arm (128c) mounted to the end of the rod (128b), a link (128d) connected to the free end of the oscillating arm (128c), and a rotary arm (128e), which extends from the support part (122b) toward the front and whose free end is connected to the link (128d). When the motor is activated, the rod (128b) and the oscillating arm (128c) are rotated, and the rotary arm (128e) is oscillated via the link (128d). Consequently, the support part (122b) and the shaft (122a) are oscillated via the oscillation of the rotary arm (128a), and the tray (121) is thus oscillated between the retracted position (P2) and the oscillating position (P3).

As shown in FIG. 12(A) and 12(B), the key groove 122d of the support part 122b extends in the longitudinal direction of the vehicle at the retracted position P2 of the tray 121, and its front side is made open. This key groove 122d is aligned with the guide member 122e, which guides the key 122c to the second rail (129) of the first storage means 125, which is to be described later, in a state in which the tray 121 is oscillated by the specified angle θ toward the oscillating position P3. The guide member 122e is provided with a guide piece 220e having U-shaped cross-sectional area for guiding the key 122c. The guide member 122e is fixed to the vehicle, which allows the key 122c of the shaft 122a to be released from the support part 122b when the tray 121 is at the oscillating position P3, and inserted into the guide piece 220e installed on the extension of the key groove 122d.

As shown in FIG. 7, the storage means 125 includes a storage box 125a, which is installed behind the seatback 114a at the back end of the cabin of the vehicle 110, the second rail 129, which guides the tray 121 into the storage position P4 within the storage box 125, and the third drive means 130, which drives the tray 121 from the oscillating position P3 to the storage position P4 along the second rail 129.

The storage box 125a with open top is intended to house the tray 121, which is transferred to the storage position along the second rails 129, and may be installed on the floor of the trunk, for example.

Figure 14:
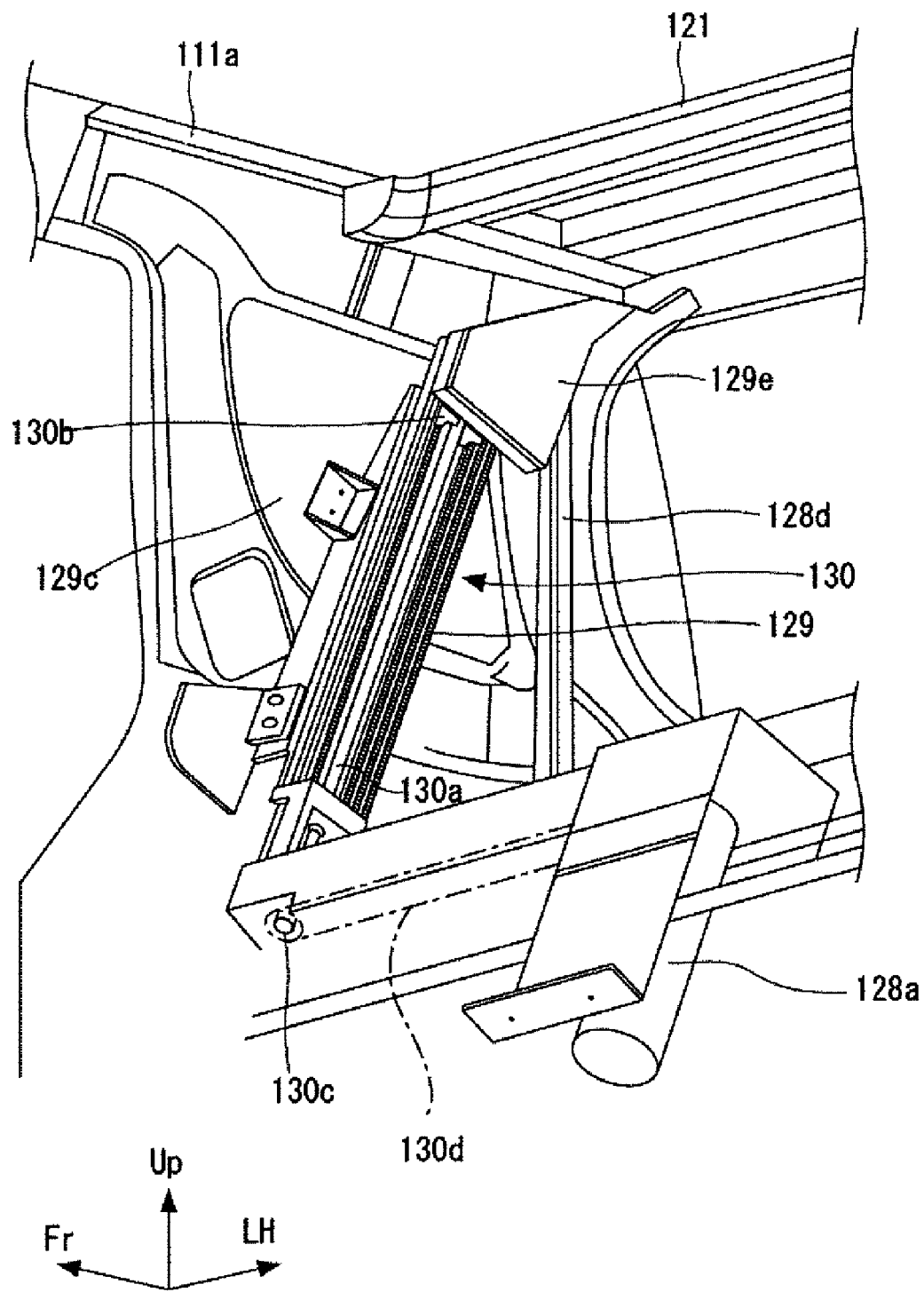
FIG. 14 is an enlarged perspective view of the main part of the tray at the storage position in the storage structure in FIG. 6.

As shown in FIG. 8, the second rails 129 are mounted to the rail rack fixing plate 129c via the rail rack 120a and the bracket 120b. As shown in FIGS. 11 and 14, the rail rack fixing plate 129c is fixed to the internal side of the vehicle 110, specifically to the side panel 115, for example.

As shown in FIG. 7, the second rail 129 extends from the rear end of the rail fixing rack 121b diagonally downward, and fixed to the vehicle.

The second rails 129 are equipped with a plate for lifting 129d, which can be slid. An arm for lifting 129e is fastened to the plate for lifting 129d. The arm for lifting 129e is equipped with a bearing 129f at the top. The shaft 122a is supported by the bearing 129f in a rotatable state.

As shown in FIG. 14, the third drive means 130 is comprised of a feed screw 130a, which extends in the longitudinal direction and supported in rotatable state, and a nut matching with the feed screw 130a and mounted to the plate for lifting 129d. The feed screw 130a is equipped with a pulley 130c at the bottom end protruding from the second rail 129.

As shown in FIG. 8, the pulley 130c is rotated by the motor 128a via a drive belt 130d.

In the storage structure for a cover member of a sliding roof type vehicle in the second embodiment, to close the opening section 111a of the vehicle 110, the storage means 125 is lifted and set at the folded position P1, and the cover member 112 placed at the folded position P1 is pulled toward the front of the vehicle. The cover member 112 is slid along the first rail 111b, and covers the opening section 111a.

To form the opening section 111a and store the cover member 112, the front end of the cover member 112 is transferred to the tray 121 located at the rear first. The cover member 112 slides toward the rear along the first rail 111b first, and then by the storage rail 121a located within the tray 121, and placed on the tray 121 folded.

The tray 121 is transferred to from the folded position P1 to the retracted position P2 at the rear via the first drive means 127.

Figure 15:
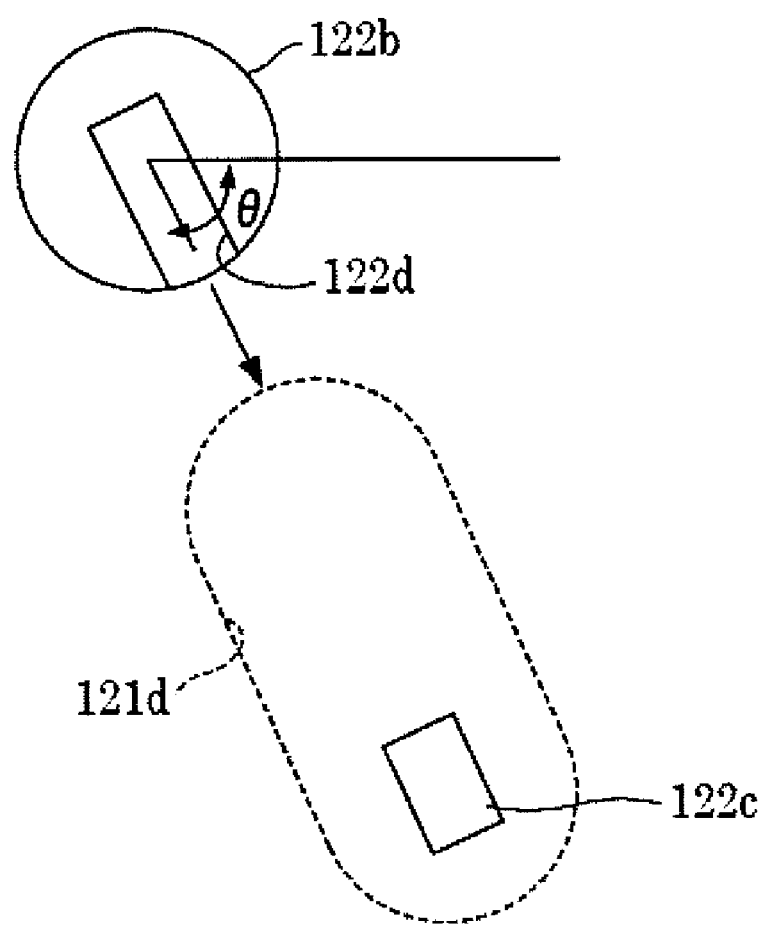
FIG. 15 is an enlarged side view of the state of transition of a coupled unit from the oscillating position to the storage position.
Figure 16:
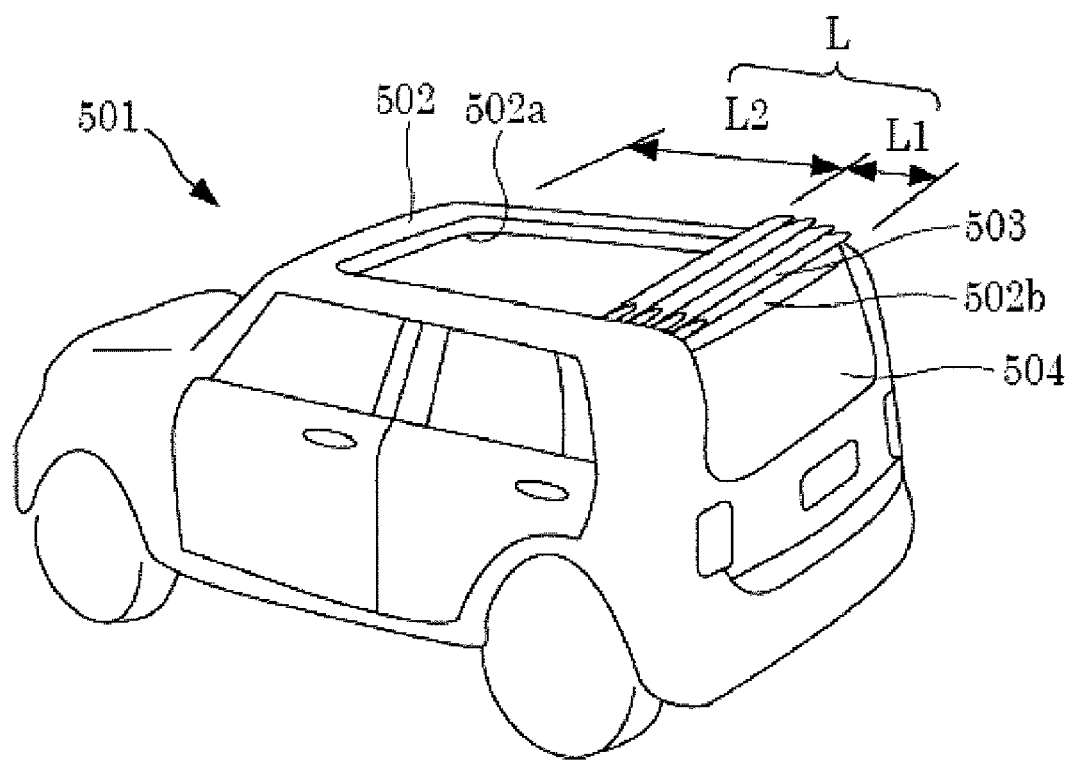
FIG. 16 is a schematic perspective view presenting a structural example of a conventional sliding roof type vehicle.

The tray 121 placed at the retracted position P2 is oscillated up to the oscillating position P3 by the oscillation of the rotary arm 128e driven by the second drive means of the oscillating means 124 and the rotation of the bearing 122b and the shaft 122a. As shown in FIG. 15, when the tray 121 reaches the oscillating position P3, the key 122c of the shaft 122a is released from the key groove 122d of the bearing 122b, allowing the tray (121) to be transferred on the second rails 129.

The feed screw 130a is then rotated by the third drive means 130, and the nut 130b comes down along the second rail 129. Since the plate for lifting 129d and the bearing 129f then come down along the second rail 129, the shaft 122a and the tray 121, which are supported in rotatable state by the bearing 129f, come down along the second rail 129. Consequently, the tray 121 is transferred from the oscillating position P3 to the storage position P4, where the tray 121 is stored in the storage box 125a.

The above operations are reversed to transfer the tray 121 from the storage position P4 to the folded position P1.

As described above, the tray 121 with the cover member 112 placed on it, can be stored easily in the storage position P4 without manually opening and/or closing other parts of the vehicle 110, such as rear hatch, thanks to the cover member storage mechanism of this invention for sliding roof type vehicles.

Furthermore, at the storage position P4, the tray holding the cover member 112 on it is stored within the storage box 125a slanted, which minimizes the depth of the storage box 125a itself. This, along with the layout in which the storage box 125a is placed along the back of the seat back 114a, minimizes the space required for storage at the back of the seat 114. Since the space at the back of the seat 114, such as trunk, can thus be maintained, convenience of the trunk is not sacrificed.

Since the tray 121 is stored at the storage position P4, and does not occupy an area of the opening section 111a on the roof 111 of the vehicle 110, a large opening area can be obtained along with the opening of the rear window glass 113a, thus providing good sense of openness.

This invention can be embodied in various forms in a range not deviating from the intended purposes. For example, the rear window glass 113a is mounted to the rear door 113 in the above embodiment. However, with a vehicle that does not have a rear door, the rear window glass 113a can be mounted to the opening of the rear panel in an openable or closable state.

The first drive means 127 is fixed on the tray 121 in this embodiment, but the first drive means 127 can be fixed on the shaft 122a side, on condition that the tray 121 and the shaft 122a can be transferred relative to each other.

Furthermore, the first drive means 127, second drive means 128, and third drive means 130 described above are one of configuration examples. It is apparent that a drive means of arbitrary configuration can be adopted if the tray 121 and the shaft 122a can be transferred, and the tray 121 can be oscillated and stored.

It is desirable that the cover member 20, 112 be created by connecting multiple parts of small width to allow folding. The materials of the cover member are not limited. Canvas or artificial leather can be used for example.

As described above, this invention provides an excellent storage structure, allowing the cover member to be stored easily in folded state without sacrificing the trunk, and ensuring large opening area while the cover member is stored.

What is claimed is:

1. A storage structure for storing a cover member of a sliding roof type vehicle comprising:
    (a) a cover member for covering foldably an opening section formed in a roof of a vehicle;
    (b) first rails for guiding the opening or closing of the cover member, provided at the right and left sides of the opening section;
    (c) a tray for placing the cover member in folded state, installed at the rear of the first rails;
    (d) retaining means provided behind the first rails for retaining the tray, for rotating the tray, and for releasing the tray;
    (e) second rails for guiding the tray into a storage position, provided on an internal wall at the rear of the vehicle, the second rails inclinedly extending from an upper end position adjacent to the rear end of the roof forwardly and downwardly, the second rails having lower ends extending almost to a floor; and
    (f) a storage box for storing the tray, installed adjacent to the back of rear seats at the bottom of the second rails, whereby the tray is rotated and released at the rear of the vehicle, and the tray moves into the storage box along the second rails.

2. The storage structure according to claim 1, wherein the tray is maintained in turnable state by the retaining means for supporting the tray, and the tray is transferred to the storage box when the tray is turned to a specified angle and is released from the retaining means.

3. A storage structure for storing a cover member of a sliding roof type vehicle comprising:
    (a) a cover member for covering foldably an opening section formed in a roof of a vehicle;
    (b) first rails for guiding the opening or closing of the cover member, provided at right and left sides of the opening section;
    (c) a tray for placing the cover member in folded state, installed at the rear of the first rails;
    (d) sliding means for sliding the tray from a position where the cover member is folded to a retracted position at the rear of the vehicle;
    (e) oscillating means for supporting the tray, while maintaining the tray in oscillatory state at the retracted position, and for releasing the tray at a specified angle;
    (f) second rails for guiding the tray into a storage position, provided on an internal wall at the rear of the vehicle, the second rails inclinedly extending from an upper end position adjacent to the rear end of the roof forwardly and downwardly, the second rails having lower ends extending almost to a floor; and (g) a storage box for storing the tray, installed adjacent to the back of the rear seats, whereby the tray is slid by the sliding means from the folded position to the retracted position, rotated by the oscillating means, and stored at the storage position within the vehicle.

4. The storage structure according to claim 3, wherein the sliding means is comprised of a shaft that crosses the tray, a support part mounted to the vehicle for supporting the shaft, and first drive means for transferring the tray between the folded position and the retracted position along the shaft.

5. The storage structure according to claim 4, wherein the sliding means further comprising first engaging part, which is provided at the end of the first rails, and second engaging part, which is engaged with the first engaging part, provided at the front part of the tray, and the tray is positioned at the folded position.

6. The storage structure in claim 4 or claim 5, wherein the oscillating means is comprised of a shaft, a support part, and second drive means for rotating the tray, the shaft being released from the support part when the tray is rotated to a specified angle by the second drive means.

7. The storage structure according to claim 3, wherein the tray comprises the rear edge of the roof of the vehicle, and the rear bottom of the tray is directly and closely connected to the top of the closed rear window glass at the folded position.

8. The storage structure according to claim 3, wherein the tray is comprised of storage rails laid out along the first rails at the folded position, and the storage rails are disengaged from the first rails at the retracted position.

9. The storage structure according to claim 1 or claim 3, wherein the cover member is made of canvas.

10. A storage structure for storing a cover member of a sliding roof type vehicle comprising:

(a) a cover member for covering foldably an opening section formed in a roof of a vehicle;
(b) first rails for guiding the opening or closing of the cover member, provided at right and left sides of the opening section;
(c) a tray for placing the cover member in folded state, installed at the rear of the first rails;
(d) sliding means for sliding the tray from a position where the cover member is folded to a retracted position at the rear of the vehicle;
(e) oscillating means for supporting the tray, while maintaining the tray in oscillatory state at the retracted position, and for releasing the tray at a specified angle;
(f) second rails for guiding the tray into a storage position, provided on an internal wall at the rear of the vehicle, the second rails extending inclinedly from an upper end position adjacent to the rear end of the roof forwardly and downwardly, the second rails having respective lower ends extending almost to a floor; and
(g) third drive means for transferring the tray along the second rails to the storage position; and
(h) a storage box for storing the tray, installed adjacent to the back of rear seats,
wherein the sliding means comprises a shaft that crosses the tray, a support part mounted to the vehicle for supporting the shaft, and first drive means for transferring the tray between the folded position and the retracted position along the shaft, and
wherein the oscillating means comprises a shaft, a support part, and second drive means for rotating the tray, the shaft being released from the support part when the tray is rotated to a specified angle by the second drive means.

* * * * *